(No Model.)
G. A. HARMAN.
FENCE POST.
No. 565,618. Patented Aug. 11, 1896.
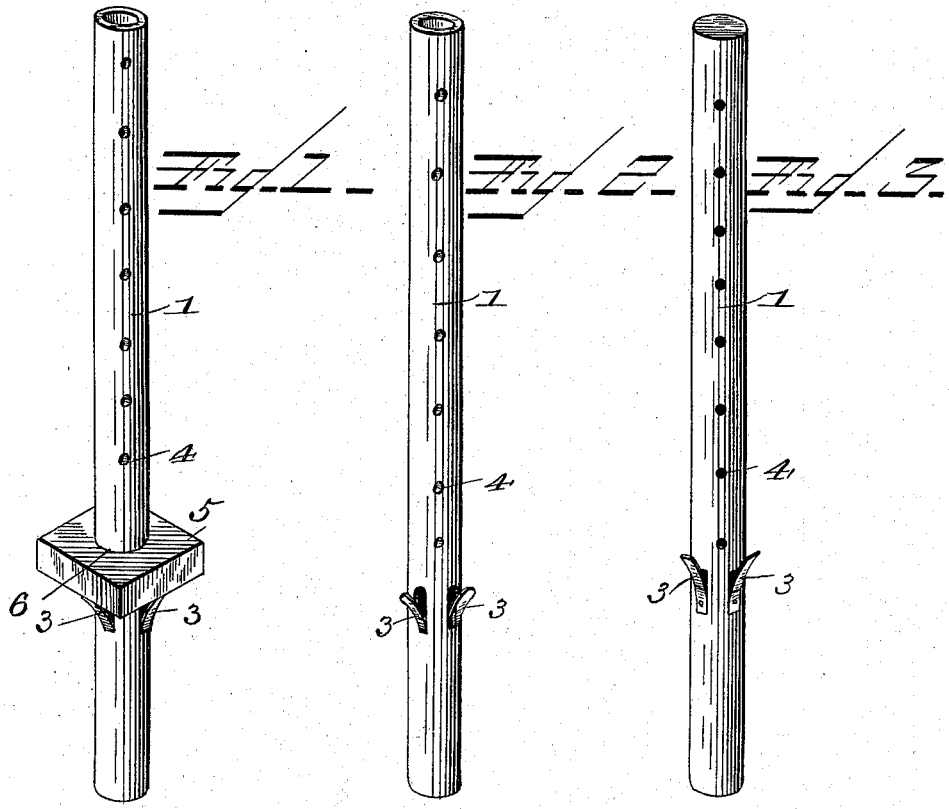
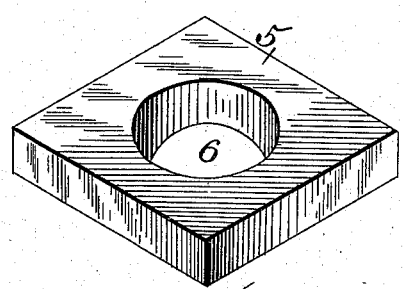
Witnesses
F. L. Durand
W. P. Suit
Inventor
George A. Harman
By J. H. A. Willson
Attorney

UNITED STATES PATENT OFFICE.

GEORGE A. HARMAN, OF LANCASTER, OHIO.

FENCE-POST.

SPECIFICATION forming part of Letters Patent No. 565,618, dated August 11, 1896.

Application filed July 22, 1895. Serial No. 556,757. (No model.)

*To all whom it may concern:*

Be it known that I, GEORGE A. HARMAN, a citizen of the United States, residing at Lancaster, in the county of Fairfield and State of Ohio, have invented certain new and useful Improvements in Fence-Posts; and I do declare the following to be a full, clear, and exact description of the invention, such as will enable others skilled in the art to which it appertains to make and use the same.

My invention relates to fence-posts.

The object is to provide a post which will withstand great strain without being dislodged or pulled from the ground or canted to one side.

With this object in view the invention consists of certain features of construction and combination of parts, which will be hereinafter fully described and claimed.

In the accompanying drawings, Figure 1 is a perspective view of my improved fence, showing its anchor in connection therewith. Fig. 2 is a detail perspective of the fence-post with the anchor removed. Fig. 3 is a detail perspective of another form of my invention. Fig. 4 is a detail perpective view of the anchor removed from the post.

In the drawings, 1 denotes the post, which may be made of tubing, as shown in Figs. 1 and 2, or of a solid rod, as shown in Fig. 3. When made of tubing, it may be cut near its lower end, as shown at 2, so as to allow prongs 3 to be sprung out from the material, which project upwardly with their free ends. Holes 4 are also formed in the post, through which short wires are passed and are twisted around the fence-wires to secure them to the posts. A square brick 5, having a central aperture 6, is adapted to be engaged with said post and prevent its accidental canting to one side.

In placing this post a hole is dug and the brick placed in the hole about four or five inches from the surface of the ground. The lower end of the post is inserted in the aperture in the brick and driven downwardly into the ground, so as to bring the spring-prongs on the under side of the brick. These prongs as they are driven through the aperture in the brick are compressed and passed freely through the same, when they will spring outward and engage the under side of the brick, thus securely holding the post in the anchor. The hole is now filled and earth packed tightly over the brick, thus effectively securing the post in position.

When the post is made of a solid rod or bar, as shown in Fig. 3, the bar or rod may be recessed and the spring-prongs bolted into these recesses, so as to project slightly out from the same.

The part known as "anchor," "block," or "brick," with central aperture through which post passes, may be made of clay burned or other material, and may be of any size or shape required.

Having thus described my invention, what I claim, and desire to secure by Letters Patent, is—

The combination with the rectangular brick set in the ground and formed with a central aperture, of the fence-post formed with a series of upwardly and outwardly projecting spring-prongs, said post being adapted to be driven through the said brick with the prongs bearing against the under side thereof, substantially as described.

In testimony whereof I affix my signature in presence of two witnesses.

GEORGE A. HARMAN.

Witnesses:
HERVEY H. SCOTT,
WM. DAUGHERTY.